US012732459B2

(12) United States Patent
Arora

(10) Patent No.: US 12,732,459 B2
(45) Date of Patent: Sep. 8, 2026

(54) GATEWAY CONNECTION DEVICE, METHOD, AND COMPUTER-READABLE MEDIUM

(71) Applicant: Rakuten Mobile, Inc., Tokyo (JP)

(72) Inventor: Vishal Arora, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 480 days.

(21) Appl. No.: 18/251,246

(22) PCT Filed: Jan. 12, 2023

(86) PCT No.: PCT/US2023/010690
§ 371 (c)(1),
(2) Date: May 1, 2023

(87) PCT Pub. No.: WO2024/151260
PCT Pub. Date: Jul. 18, 2024

(65) Prior Publication Data

US 2025/0080458 A1 Mar. 6, 2025

(51) Int. Cl.

*H04L 45/741* (2022.01)
*H04L 61/4511* (2022.01)
*H04L 69/167* (2022.01)
*H04L 101/659* (2022.01)

(52) U.S. Cl.
CPC ........ *H04L 45/741* (2013.01); *H04L 61/4511* (2022.05); *H04L 69/167* (2013.01); *H04L 2101/659* (2022.05)

(58) Field of Classification Search
CPC . H04L 45/741; H04L 61/4511; H04L 69/167; H04L 2101/659
See application file for complete search history.

(56) References Cited

U.S. PATENT DOCUMENTS

2003/0187882 A1* 10/2003 Jinmei ................ H04L 63/1466
2013/0254423 A1* 9/2013 George, IV ......... H04L 61/4511 709/238
2014/0050209 A1* 2/2014 Bajko ................... H04W 72/27 370/338
2020/0252287 A1* 8/2020 Arora ................. H04L 61/5014
2023/0007474 A1* 1/2023 Ni ......................... H04L 63/029

FOREIGN PATENT DOCUMENTS

EP 3306901 A1 * 4/2018 .......... H04L 61/4511

* cited by examiner

*Primary Examiner* — Cheikh T Ndiaye
(74) *Attorney, Agent, or Firm* — HAUPTMAN HAM, LLP

(57) ABSTRACT

A device includes a memory having non-transitory instructions stored therein and a processor coupled to the memory, and being configured to execute the instructions. The instructions thereby cause the device to transmit an internet protocol version 6 (IPv6) address request to a router, receive a router advertisement message in response to the IPV6 address request, detect an invalid result indicator in the router advertisement message, in response to the invalid result indicator, transmit an internet protocol version 4 (IPv4) address request to the router, receive IPv4 address and domain name system (DNS) server information in response to the IPv4 address request, and in response to the IPv4 address and DNS server information, perform a router connection operation using IPv6.

20 Claims, 5 Drawing Sheets

400 icmpv6

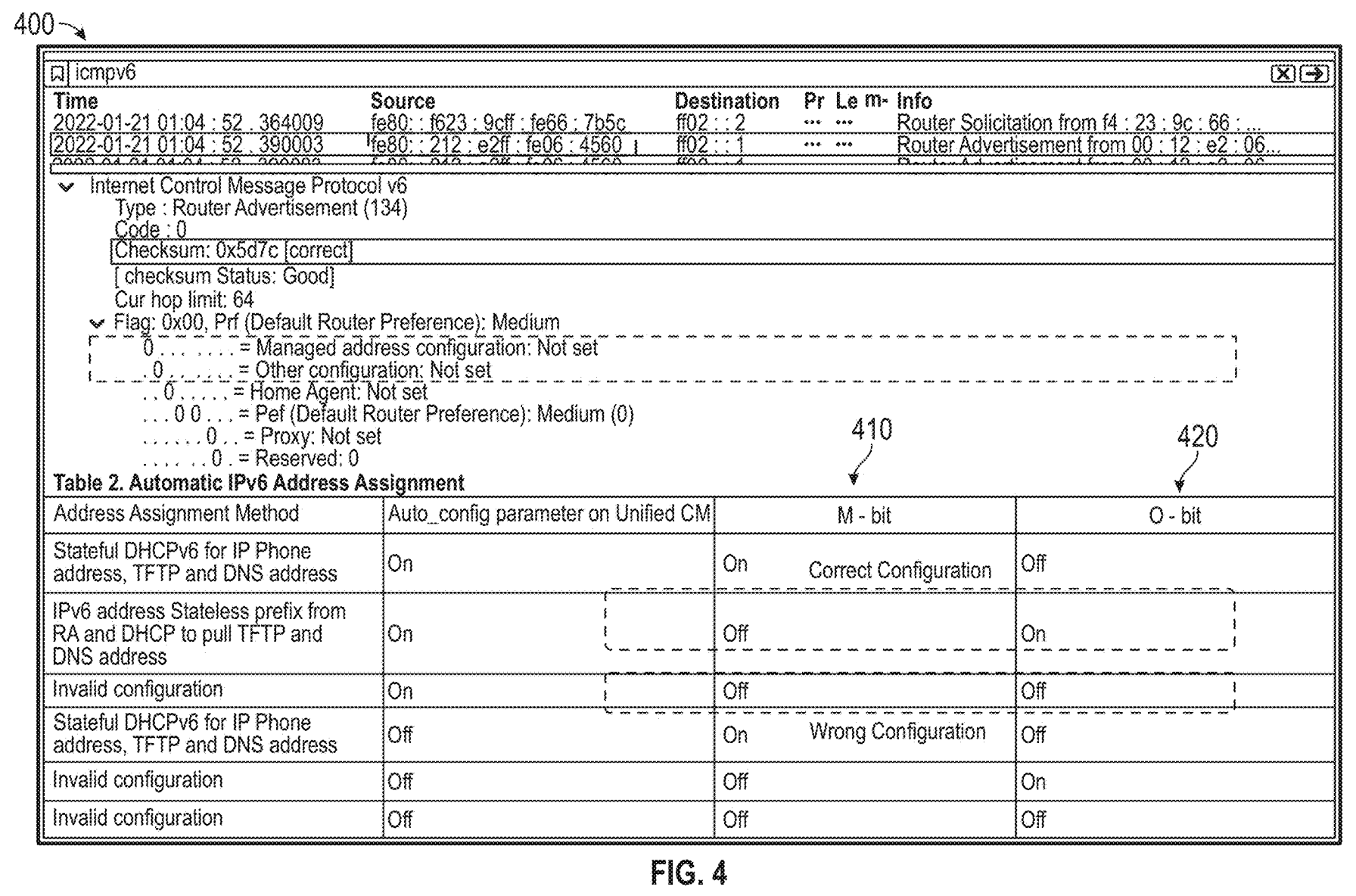

| Time | Source | Destination | Pr | Le | m- | Info |
|---|---|---|---|---|---|---|
| 2022-01-21 01:04 : 52 . 364009 | fe80: : f623 : 9cff : fe66 : 7b5c | ff02 : : 2 | ... | ... | | Router Solicitation from f4 : 23 : 9c : 66 : ... |
| 2022-01-21 01:04 : 52 . 390003 | fe80: : 212 : e2ff : fe06 : 4560 | ff02 : : 1 | ... | ... | | Router Advertisement from 00 : 12 : e2 : 06... |

Internet Control Message Protocol v6
Type : Router Advertisement (134)
Code : 0
Checksum: 0x5d7c [correct]
[ checksum Status: Good]
Cur hop limit: 64
Flag: 0x00, Prf (Default Router Preference): Medium
0 . . . . . . . = Managed address configuration: Not set
. 0 . . . . . . = Other configuration: Not set
. . 0 . . . . . = Home Agent: Not set
. . . 0 0 . . . = Pef (Default Router Preference): Medium (0)
. . . . . . 0 . . = Proxy: Not set
. . . . . . . 0 . = Reserved: 0

410 420

Table 2. Automatic IPv6 Address Assignment

| Address Assignment Method | Auto_config parameter on Unified CM | M - bit | O - bit |
|---|---|---|---|
| Stateful DHCPv6 for IP Phone address, TFTP and DNS address | On | On Correct Configuration | Off |
| IPv6 address Stateless prefix from RA and DHCP to pull TFTP and DNS address | On | Off | On |
| Invalid configuration | On | Off | Off |
| Stateful DHCPv6 for IP Phone address, TFTP and DNS address | Off | On Wrong Configuration | Off |
| Invalid configuration | Off | Off | On |
| Invalid configuration | Off | Off | Off |

FIG. 4

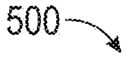
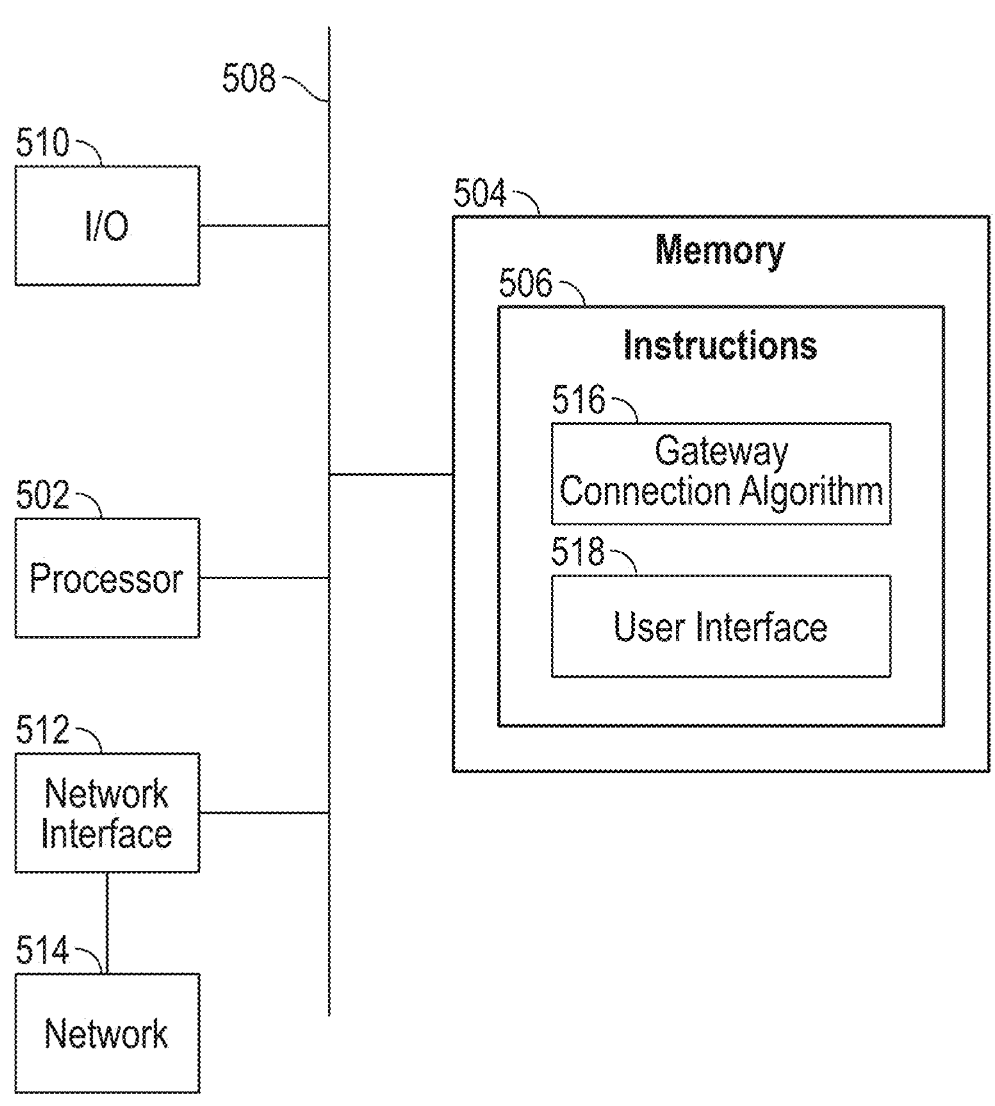
FIG. 5

GATEWAY CONNECTION DEVICE, METHOD, AND COMPUTER-READABLE MEDIUM

TECHNICAL FIELD

This description relates to a method, system, device, and non-transitory computer-readable medium directed to automated gateway connection operations in telecommunication applications.

BACKGROUND

Telecommunication, e.g., cellular, systems include a large number of cells having a variety of sizes and signal strengths. A given cell corresponds to a base station that typically communicates with base stations of other cells through a radio access network (RAN), a mobile telecommunication system that implements a radio access technology (RAT). The RAN resides between devices such as mobile phones, computers, or other devices and, along with the base stations, provides connections through which these devices communicate with each other.

SUMMARY

In some embodiments, a device includes a memory having non-transitory instructions stored therein and a processor coupled to the memory, and being configured to execute the instructions, thereby causing the device to transmit an internet protocol version 6 (IPv6) address request to a router, receive a router advertisement message in response to the IPv6 address request, detect an invalid result indicator in the router advertisement message, in response to the invalid result indicator, transmit an internet protocol version 4 (IPv4) address request to the router, receive IPv4 address and domain name system (DNS) server information in response to the IPv4 address request, and in response to the IPv4 address and DNS server information, perform a router connection operation using IPv6.

In some embodiments, a gateway connection method executed by a processor of a device includes transmitting an IPv6 address request to a router, receiving a router advertisement message in response to the IPV6 address request, detecting an invalid result indicator in the router advertisement message, in response to the invalid result indicator, transmitting an IPv4 address request to the router, receiving IPv4 address and DNS server information in response to the IPV4 address request, and in response to the IPv4 address and DNS server information, performing a router connection operation using IPv6.

In some embodiments, a computer-readable medium includes instructions executable by a controller of a device to cause the controller to perform operations including transmitting an IPV6 address request to a router, receiving a router advertisement message in response to the IPV6 address request, detecting an invalid result indicator in the router advertisement message, in response to the invalid result indicator, transmitting an IPv4 address request to the router, receiving IPv4 address and DNS server information in response to the IPv4 address request, and in response to the IPv4 address and DNS server information, performing a router connection operation using IPv6.

BRIEF DESCRIPTION OF DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

FIG. 4 depicts a router advertisement message, in accordance with some embodiments.

FIG. 5 is a diagram of a processor-based device, in accordance with some embodiments.

DETAILED DESCRIPTION

Figure 1:
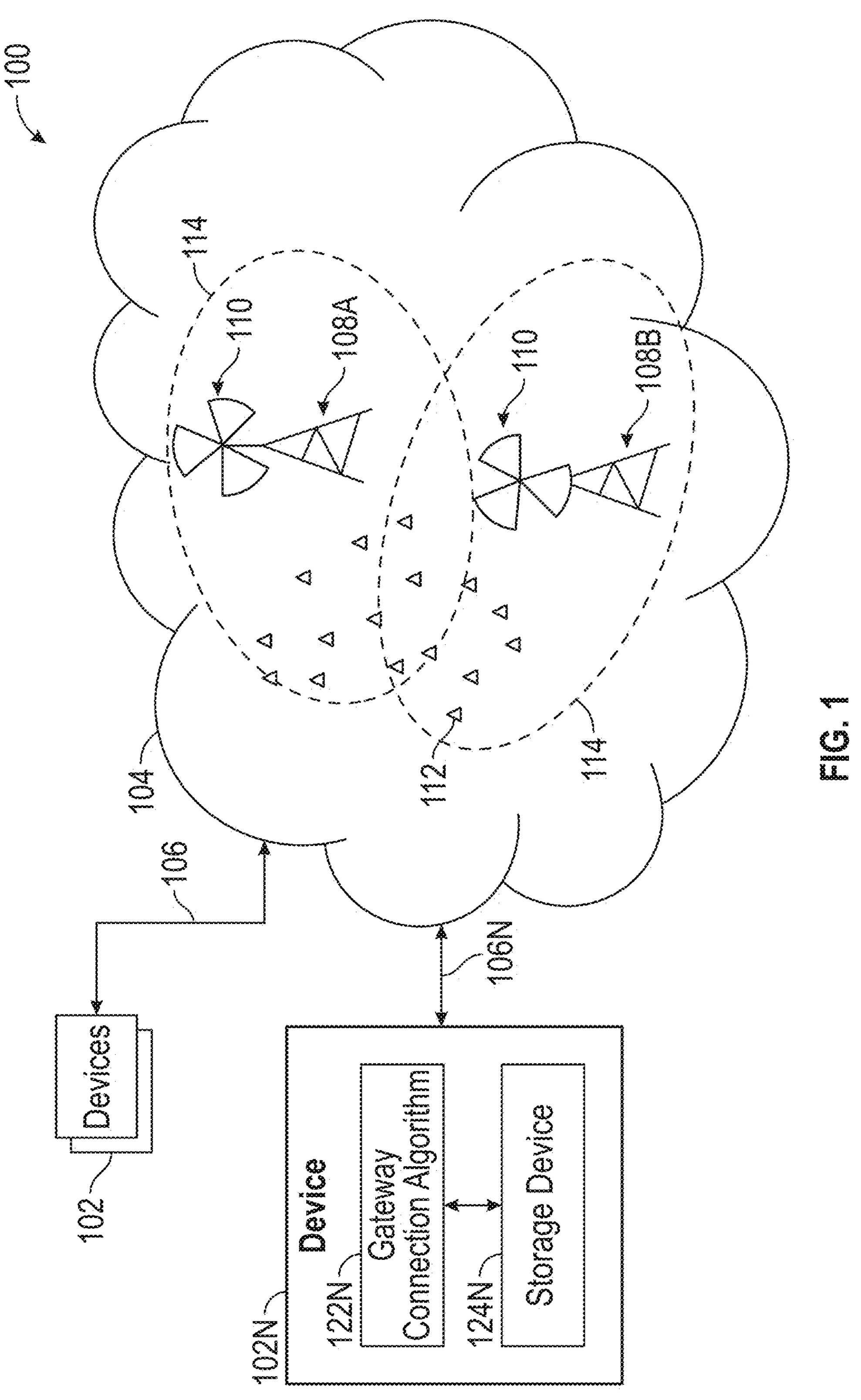
FIG. 1 is a diagram of a communication system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows include embodiments in which the first and second features are formed or positioned in direct contact and include embodiments in which additional features are formed or positioned between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of a system or object in use or operation in addition to the orientation depicted in the figures. The system is otherwise oriented (rotated 90 degrees or at other orientations) and the spatially relative descriptors used herein likewise are interpreted accordingly.

In various embodiments, some or all of a device, method, and computer readable medium are directed to using a device, e.g., a small cell base station, to transmit an IPV6 address request to a router, receive a router advertisement message in response, detect an invalid result indicator in the router advertisement message, transmit an IPv4 address request to the router, receive IPv4 address and DNS server information in response, and perform a router connection operation using IPv6.

By transmitting an IPv4 address request in response to detecting an invalid result indicator in response to an IPV6 address request, the device is capable of successfully performing a gateway or other connection operation compared to other approaches in which an IPv4 address request is not transmitted in response to detecting an invalid result indicator in response to an IPv6 address request, thereby improving device operability and avoiding connection failures, e.g., as part of plug-and-play (PnP) operations.

FIG. 1 is a diagram of a telecommunication system 100 (hereinafter referred to as "system 100"), in accordance with some embodiments. FIG. 1 is simplified for the purpose of illustration.

System 100 includes devices 102 coupled to a network 104 by links 106. Network 104 is coupled to a device 102N of devices 102 by a link 106N of links 106. Devices 102 including device 102N are coupled to each other through network 104 and links 106 including link 106N.

In some embodiments, devices 102 correspond to combinations of computing devices, computing systems, servers, server clusters, and/or pluralities of server clusters also referred to as server farms or data centers in some embodiments. In some embodiments, a device 500 discussed below with respect to FIG. 5 is an embodiment of a device 102.

In some embodiments, one or more of devices 102 is a type of mobile device, mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of devices 102 includes a display by which a user interface is displayed.

In some embodiments, one or more of devices 102 is a base station corresponding to one or more cells, e.g., a base station 108 corresponding to one or more cells 114, each discussed below. In some embodiments, one or more of devices 102 includes a distributed unit (DU), a centralized unit (CU), or a virtual CU (VCU). In some embodiments, a plurality of devices 102 are configured in accordance with a base station architecture including one or more instances of device 102 configured as a CU or VCU coupled with one or more instances of device 102 configured as a DU. Other configurations and/or types of devices 102 are within the scope of the present disclosure.

In the embodiment depicted in FIG. 1, device 102N includes a gateway connection algorithm 122N and a storage device 124N configured to store gateway connection information, e.g., an internet protocol (IP) address. In some embodiments, gateway connection algorithm 122N is also referred to as RAN connection algorithm 112N or network connection algorithm 112N.

In the embodiment depicted in FIG. 1, device 102N including gateway connection algorithm 122N is a single instance of plurality of devices 102. In some embodiments, device 102N including gateway connection algorithm 122N includes more than one instance of plurality of devices 102. Gateway connection algorithm 122N is further discussed below.

A storage device, e.g., storage device 124N, is one or more computer-readable, non-volatile storage devices, e.g., a database. In some embodiments, a storage device includes a memory 504 discussed below with respect to FIG. 5. In the embodiment depicted in FIG. 1, storage device 124N is located on device 102N. In some embodiments, storage device 124N is located externally to device 102N, e.g., on one or more servers accessed via link 106N.

Network 104 is one or more interconnected devices (not depicted individually) configured to provide electronic communications between and among the interconnected devices and plurality of devices 102, in some cases through plurality of links 106. In some embodiments, network 104 corresponds to the internet.

In some embodiments, network 104 includes or represents a radio access network (RAN), a mobile telecommunication system that implements a radio access technology (RAT) and resides between devices such as mobile phones, computers, or other devices and provides connection with plurality of devices 102.

In some embodiments, one or more of the interconnected devices of network 104 and/or plurality of devices 102 are configured as one or more of a local area network (LAN), a wide area network (WAN), a metropolitan area network (MAN), an internet area network (IAN), a campus area network (CAN), or a virtual private network (VPN). In some embodiments, one or more of the interconnected devices of network 104 and/or plurality of devices 102 are configured as a backbone (BB) or core network (CN), a part of a computer network that interconnects networks, providing a path for the exchange of information between different LANs, WANs, etc. In some embodiments, one or more of the interconnected devices of network 104 and/or plurality of devices 102 is configured as a backbone router (BBR), a device through which one or more networks external to a backbone or CN connects to and communicates with the backbone or CN.

In some embodiments, some of the interconnected devices of network 104 and/or devices 102 are configured as server clusters, e.g., included in a data center. In some embodiments, the server clusters are part of a cloud computing environment.

In the embodiment depicted in FIG. 1, network 104 includes base stations 108A and 108B (hereinafter base station 108), each including an antenna 110 wirelessly connected to one or more instances of user equipment (UE) 112 located in a geographic coverage area 114.

In some embodiments, network 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN). In some embodiments, network 104 resides between a UE 112 (e.g., mobile phone, a computer, or any remotely controlled machine) and one or more core networks.

In some embodiments, network 104 is a hierarchical telecommunications network including one or more intermediate link(s), also referred to as backhaul portions in some embodiments, between a RAN and one or more core networks. Two common methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. UEs 112 communicating with a base station 108 constitute a local subnetwork. In some embodiments, a backhaul includes wired, fiber optic, and/or wireless components including microwave bands and mesh and edge network topologies that use a high-capacity wireless channel to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, a base station 108 is a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers, transceivers, digital signal processors, control electronics, a remote radio head (RRH), primary and backup electrical power sources, and sheltering. Base stations are known by other names such as base transceiver station, mobile phone mast, or cell tower. In some embodiments, base stations are edge devices configured to wirelessly communicate with UEs. The edge device provides an entry point into service provider core networks. Examples include routers, routing switches, integrated access devices (IADs), multiplexers, and a variety of MAN and WAN access devices.

In at least one embodiment, an instance of antenna 110 is a sector antenna, e.g., a directional microwave antenna with a sector-shaped radiation pattern, or a plurality of sector antennae, e.g., configured to have a full-circle coverage area 114. In some embodiments, an instance of antenna 110 is a circular antenna. In some embodiments, an instance of antenna 110 operates at microwave or ultra-high frequency (UHF) frequencies (300 Megahertz (MHz) to 3 Gigahertz (GHz)).

In various embodiments, a geographic coverage area 114, also referred to as a cell 114 in some embodiments, is a three-dimensional space having a shape and size based on the configurations of the corresponding base station 108, e.g., a power level, and antenna 110, e.g., a number of sectors. In various embodiments, a geographic coverage area 114 has a substantially spherical, hemispherical, conical, columnar, circular or oval disc, or other shape corresponding to a base station and antenna configuration. In various embodiments, one or both of the shape or size of a geographic coverage area 114 varies over time, e.g., based on a variable base station power level and/or a variable number of activated antennae and/or antenna sectors.

In some embodiments, a geographic coverage area 114 is referred to as a macro-cell, a micro-cell, a pico-cell, a femto-cell, or a small cell. In some embodiments, a coverage area 114 is referred to as an indoor small cell (IDSC).

Some or all instances of base station 108 are configured to transmit reference signals including at least one primary synchronization signal (PSS), at least one secondary synchronization signal (SSS), and additional physical channel signals. The physical channel signals include master information blocks (MIBs) and system information blocks (SIBs) that together include cell identifiers, tracking area codes, cell availability indicators (e.g., suitable, acceptable, reserved, barred, available to closed subscriber group only), service level indicators, time and/or frequency resource allocation indicators, and other information relevant to cell-based communications.

In some embodiments, an instance of base station 108, e.g., device 102N, is configured to enable more than one cell 114, e.g., corresponding to separate directions and/or frequency ranges. In some embodiments, an instance of base station 108 corresponds to a DU configured to communicate with a network, e.g., a RAN, through a gateway, e.g., a secure gateway or home gateway (HGW) using an instance of device 102 configured as a router. In some embodiments, the network includes a CU or VCU, and the instance of base station 108 is a DU configured to communicate with the CU or VCU through the gateway.

In some embodiments, an instance of UE 112 is a computer or computing system. In some embodiments, an instance of UE 112 has a liquid crystal display (LCD), light-emitting diode (LED) or organic light-emitting diode (OLED) screen interface, such as a graphical user interface providing a touchscreen interface with digital buttons and keyboard or physical buttons along with a physical keyboard. In some embodiments, an instance of UE 112 connects to the internet and interconnects with other devices. In some embodiments, an instance of UE 112 incorporates integrated cameras, the ability to place and receive voice and video telephone calls, video games, and Global Positioning System (GPS) capabilities. In some embodiments, an instance of UE 112 performs as a virtual machine or allows third-party apps to run as a container. In some embodiments, an instance of UE 112 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, a given instance of UE 112 corresponds to device 500 discussed below with respect to FIG. 5.

In some embodiments, a user of network 104, e.g., a user of a device 102, accesses network 104 through a service provider, a business or organization that sells bandwidth or network access by providing direct internet backbone access to internet service providers (ISPs) and usually access to its network access points (NAPs). Service providers are sometimes referred to as backbone providers or internet providers. Service providers consist of telecommunications companies, data carriers, wireless communications providers, ISPs, and cable television operators offering high-speed internet access.

Links 106 include hardware configured to enable electronic communications between devices 102 and network 104. In various embodiments, one or more of links 106 is a wired link, e.g., fiber optic, shielded, twisted pair, or other cabling, or a wireless link type.

In various embodiments, one or more of links 106 is configured to communicate based on code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wired or wireless data communications network. Accordingly, the exemplary illustrations provided herein are not intended to limit the embodiments of the disclosure and are merely to aid in the description of aspects of the embodiments of the disclosure.

Gateway connection algorithm 122N is one or more sets of instructions configured to be executed on device 102N, e.g., stored in storage device 124N, whereby device 102N performs a gateway connection operation in accordance with a gateway connection method 200 discussed below with respect to FIG. 2. In some embodiments, gateway connection algorithm 122N is configured to run as a standalone program or within one or more sets of instructions. In some embodiments, gateway connection algorithm 122N is configured to run on one or more of devices 102 in addition to device 102N.

In some embodiments, gateway connection algorithm 122N is configured to be included in, or to include, an automated gateway connection sequence, e.g., a plug-play (PnP) procedure and/or power-on sequence. In some embodiments, gateway connection algorithm 122N is configured to be executed on device 102N configured as a small cell base station, e.g., a femtocell base station also referred to as a femto device in some embodiments. In some embodiments, gateway connection algorithm 122N is configured to run as a standalone program or within one or more sets of instructions.

Device 102N is configured to perform operations, e.g., PnP operations, corresponding to each of internet protocol version 4 (IPv4) and internet protocol version 6 (IPv6). Device 102N including gateway connection algorithm 122N is thereby configured to execute gateway or other connection activities in accordance with gateway connection method 200 discussed below, whereby device 102N transmits an IPV6 address request to a router, receives a router advertisement message in response, detects an invalid result indicator in the router advertisement message, transmits an IPv4 address request to the router, receives IPv4 address and DNS server information in response, and performs a router connection operation using IPv6.

Device 102N is thereby capable of successfully performing a gateway or other connection operation compared to other approaches in which an IPv4 address request is not transmitted in response to detecting an invalid result indicator in response to an IPv6 address request such that device operability is improved and connection failures are avoided.

Figure 2:
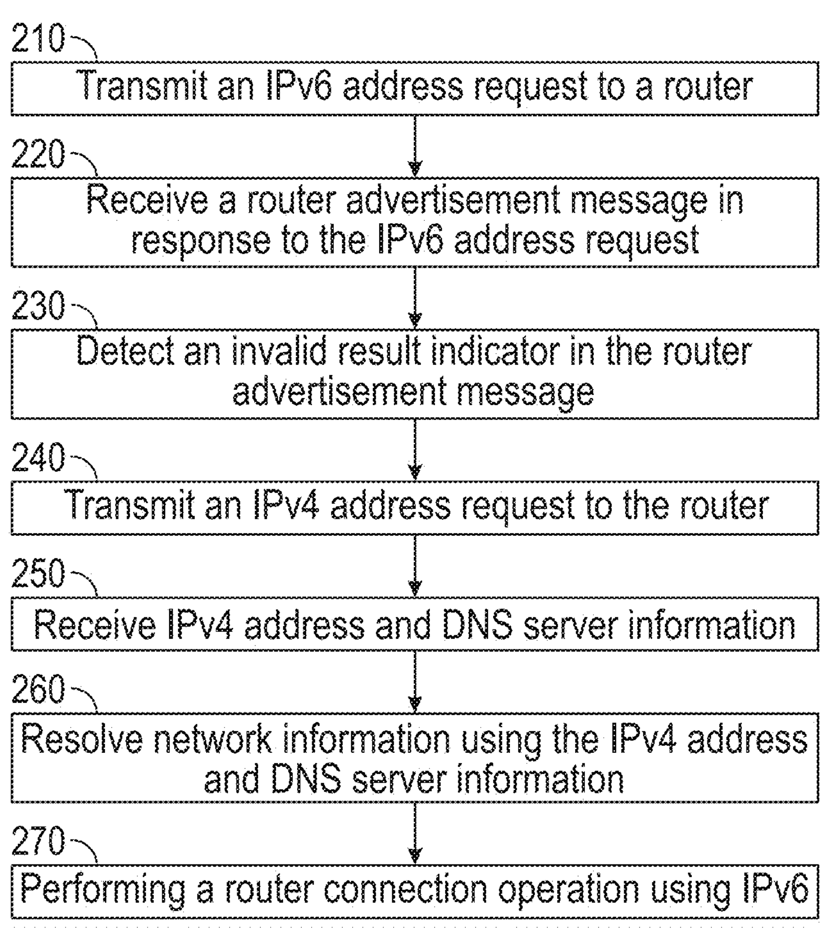
FIG. 2 is a flowchart of a gateway connection method, in accordance with some embodiments.

FIG. 2 is a flowchart of gateway connection method 200, in accordance with some embodiments. Gateway connection method 200, also referred to as method 200 in some embodiments, is operable on a device of a telecommunication system, e.g., device 102N of system 100 discussed above with respect to FIG. 1.

Additional operations may be performed before, during, between, and/or after the operations of method 200 depicted in FIG. 2, and some other operations may only be briefly described herein. In some embodiments, other orders of operations of method 200 are within the scope of the present disclosure. In some embodiments, one or more operations of method 200 are not performed. In some embodiments, the operations of method 200 are included in another method, e.g., a method of performing a PnP and/or power-on sequence.

In some embodiments, some or all of the operations of method 200 discussed below are capable of being performed automatically, e.g., by network device 102N including gateway connection algorithm 122N, discussed above with respect to FIG. 1 and/or by using processing circuitry 502 to execute a gateway connection algorithm 516, each discussed below with respect to FIG. 5.

The operations of method 200 are discussed below with reference to various features of system 100 that are also discussed above with respect to FIG. 1.

Figure 3:
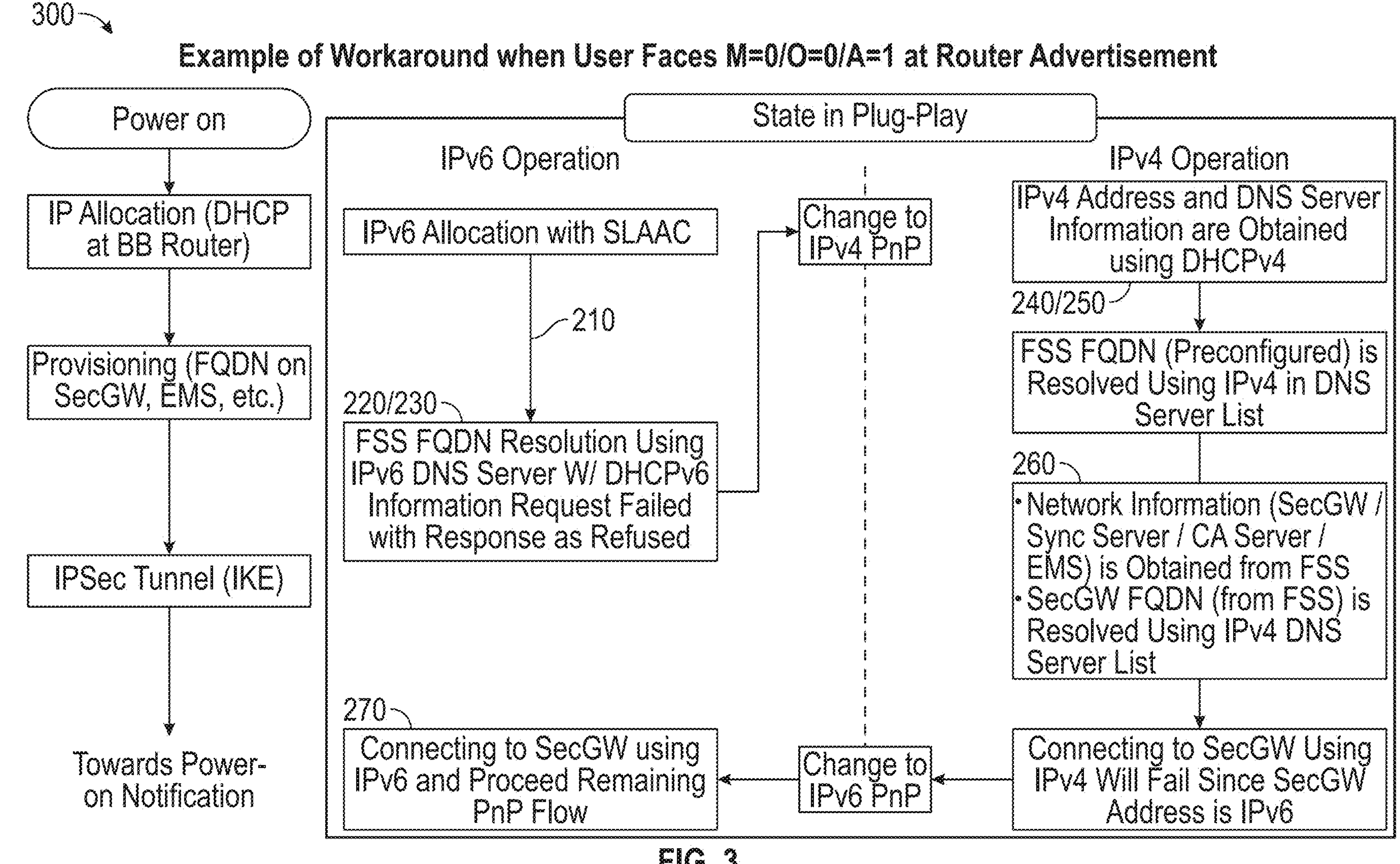
FIG. 3 is a flowchart of a gateway connection method, in accordance with some embodiments.

FIG. 3 depicts a non-limiting example that illustrates the execution of some or all of the operations of method 200 using an embodiment of system 100 and device 102N, as further discussed below.

At operation 210, in some embodiments, a device transmits an IPV6 address request to a router. In some embodiments, the device transmitting the IPV6 address request to the router includes device 102N transmitting the IPV6 address request over link 106N to an instance of device 102 configured as a router. In some embodiments, the device transmits the IPV6 address request including a DNS server information request.

In some embodiments, the device transmits the IPV6 address request to the router after initiating a PnP procedure and/or power-on sequence. In some embodiments, the device transmits the IPv6 address request to the router after initiating a stateless address autoconfiguration (SLAAC) operation or a stateful address autoconfiguration operation. In some embodiments, the device transmits the IPV6 address request by operating in an IPV6 mode, e.g., as part of a default setup or preset mode, or in response to a user input.

In some embodiments, the device transmits the IPV6 address request corresponding to a file system server (FSS) fully qualified domain name (FQDN) resolution operation. In some embodiments, the FSS is included in a RAN, and the device transmits the IPV6 address request corresponding to establishing a gateway connection to the RAN. In some embodiments, the device transmits the IPv6 address request in accordance with a dynamic host configuration protocol version 6 (DHCP(v6)).

At operation 220, in some embodiments, the device receives a router advertisement message in response to the IPV6 address request. In some embodiments, the device receiving the router advertisement message includes device 102N receiving the router advertisement message from the instance of device 102 through link 106N.

In some embodiments, the device receiving the router advertisement message includes the device receiving a router advertisement message 400 discussed below with respect to FIG. 4.

At operation 230, in some embodiments, the device detects an invalid result indicator in the router advertisement message. In some embodiments, the device detecting the invalid result indicator includes device 102N detecting the invalid result indicator.

In some embodiments, the device detecting the invalid result indicator includes the device comparing one or more data bits in the router advertisement message to one or more reference data bits, e.g., as part of reference data stored in storage device 124N.

In some embodiments, the device detecting the invalid result indicator in the router advertisement message includes detecting a value of zero for each of an M-bit and an O-bit of a header of the router advertisement message, e.g., router advertisement message 400 discussed below with respect to FIG. 4.

At operation 240, in some embodiments, in response to the invalid result indicator, the device transmits an IPV4 address request to the router. In some embodiments, the device transmitting the IPV4 address request to the router includes device 102N transmitting the IPV4 address request to the instance of device 102 configured as a router through link 106N. In some embodiments, the device transmits the IPv4 address request including a DNS server information request.

In some embodiments, the device transmitting the IPv4 address request to the router includes the device switching from an IPv6 operational mode to an IPv4 operational mode, e.g., switching from an IPV6 PnP procedure to an IPv4 PnP procedure.

At operation 250, in some embodiments, the device receives IPv4 address and DNS server information in response to the IPv4 address request. In some embodiments, the device receiving the IPV4 address and DNS server information includes device 102N receiving the IPV4 address and DNS server information from the instance of device 102 configured as a router through link 106N.

At operation 260, in some embodiments, the device resolves network information using the IPv4 address and DNS server information. In some embodiments, the device resolving network information includes device 102N resolving the network information.

In some embodiments, the device resolving the network information includes using the IPv4 address and DNS server information to obtain one or more of secure gateway (SecGW), certification authority (CA), or element management system (EMS) information from an FSS of the network. In some embodiments, the device resolving the network information includes using the IPV4 address and DNS server information to obtain a SecGW FQDN from the FSS.

At operation 270, in some embodiments, in response to the IPv4 address and DNS server information, the device performs a router connection operation using IPv6. In some embodiments, the device performing the router connection operation includes device 102N performing the router connection operation through link 106N.

In some embodiments, the device performing the router connection operation includes the device switching from the IPv4 operational mode to the IPv6 operational mode, e.g., returning to the IPV6 PnP procedure from the IPv4 PnP procedure.

In some embodiments, the device performing the router connection operation includes the device connecting to a SecGW using IPv6. In some embodiments, the device performing the router connection operation includes the device executing an internet key exchange (IKE) operation as part of establishing an internet protocol security (IPsec) tunnel. In some embodiments, the device performing the router connection operation includes the device transmitting a power-on notification, e.g., to an EMS.

By performing some or all of the operations of method 200, a device, e.g., device 102N, automatically transmits an IPV6 address request to a router, receives a router advertisement message in response, detects an invalid result indicator in the router advertisement message, transmits an IPv4 address request to the router, receives IPv4 address and DNS server information in response, and performs a router connection operation using IPv6, thereby obtaining the benefits discussed above.

FIG. 3 is a flowchart of a gateway connection method 300, in accordance with some embodiments. Method 300 depicted in FIG. 3 is a non-limiting example of method 200 including operations 210-270 discussed above and is simplified for the purpose of illustration.

In the example depicted in FIG. 3, method 300 corresponds to operations included in a power-on sequence including plug-play (PnP) operations. In method 300, operation 210 corresponds to an IPV6 SLAAC operation; operations 220 and 230 correspond to FSS FQDN resolution using IPv6 DNS server w/DHCPv6 Information Request failed with response as refused based on bit M=0 and bit O=0; operations 240 and 250 correspond to a change to IPv4 operation followed by IPv4 address and DNS server information being successfully obtained using DHCPv4; operation 260 corresponds to resolving preconfigured FSS FQDN using IPv4 DNS in a DNS server list; and operation 270 corresponds to a change to IPv4 operation followed by using IPv6 to connect to SecGW and proceed with PnP flow including establishing an IPSec tunnel and transmitting a power-on notification.

By including the non-limiting examples of operations 210-270, method 300 is capable of realizing the benefits of method 200 discussed above.

FIG. 4 depicts a router advertisement message 400, in accordance with some embodiments. Router advertisement message 400 depicted in FIG. 4 is a non-limiting example of a router advertisement message 400 discussed above with respect to system 100 depicted in FIG. 1 and operations 220 and 230 of method 200 discussed above with respect to FIG. 2. Router advertisement message 400 is edited and annotated for the purpose of illustration.

In the example depicted in FIG. 4, router advertisement message 400 includes an M bit 410 and an O bit 420. As depicted, a correct configuration of M bit 410 and O bit 420 corresponds to Off and On indicators, respectively, and a wrong configuration corresponds to each of M bit 410 and O bit 420 having the Off indicator. In some embodiments, an Off indicator corresponds to a zero bit or low logic level, and an On indicator corresponds to a one bit or high logic level.

In embodiments in which a router advertisement message corresponds to router advertisement message 400, a device, e.g., device 102N discussed above, detects an invalid indicator as each of M bit 410 and O bit 420 having the Off indicator, e.g., by comparing the indicators to stored reference indicators.

Embodiments in which a device detects indicators other than the Off and On indicators of M bit 410 and O bit 420 of router advertisement message 400 are within the scope of the present disclosure.

FIG. 5 is a functional block diagram of a computer or processor-based device 500 upon which or by which an embodiment is implemented.

Processor-based device 500 is programmed to facilitate automated gateway connections as described herein, and includes, for example, bus 508, processing circuitry 502, also referred to a processor 502 in some embodiments, and memory 504 components.

In some embodiments, processor-based device 500 includes a communication mechanism such as bus 508 for transferring information and/or instructions among the components of processor-based device 500. Processing circuitry 502 is connected to bus 508 to obtain instructions for execution and process information stored in, for example, memory 504. In some embodiments, processing circuitry 502 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of processing circuitry 502. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, processing circuitry (or multiple processors) 502 performs a set of operations on information as specified by a set of instructions stored in memory 504 related to gateway connection operations, e.g., gateway connection algorithm 516 corresponding to gateway connection algorithm 122N discussed above with respect to FIGS. 1-4. The execution of the instructions causes the processor to perform specified functions.

Processing circuitry 502 and accompanying components are connected to memory 504 via bus 508. Memory 504 includes one or more of dynamic memory (e.g., RAM, magnetic disk, writable optical disk, or the like) and static memory (e.g., ROM, CD-ROM, or the like) for storing executable instructions that when executed perform the operations described herein to facilitate automated network configuration. In some embodiments, memory 504 also stores the data associated with or generated by the execution of the operations, e.g., one or more reference data bits as discussed above with respect to FIG. 1.

In one or more embodiments, memory 504, such as a random-access memory (RAM) or any other dynamic storage device, stores information including processor instructions for facilitating network application implementation. Dynamic memory allows information stored therein to be changed. RAM allows a unit of information stored at a location called a memory address to be stored and retrieved independently of information at neighboring addresses. Memory 504 is also used by processing circuitry 502 to store temporary values during execution of processor instructions. In various embodiments, memory 504 includes a read only memory (ROM) or any other static storage device coupled to bus 508 for storing static information, including instructions, that is not capable of being changed by processing circuitry 502. Some memory is composed of volatile storage that loses the information stored thereon when power is lost. In some embodiments, memory 504 includes a non-volatile (persistent) storage device, such as a magnetic disk, optical disk, or flash card, for storing information, including instructions, that persists even when device 500 is turned off or otherwise loses power.

The term "computer-readable medium" as used herein refers to any medium that participates in providing information to processing circuitry 502, including instructions 506 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

Instructions 506 also include a user interface 518, one or more sets of instructions configured to allow effective operation and control of device 500 by a user. In some embodiments, user interface 518 is configured to operate though one or more layers, including a human-machine interface (HMI) that interfaces machines with physical input hardware such as keyboards, mice, or game pads, and output hardware such as computer monitors, speakers, printers, and other suitable user interfaces.

In some embodiments, a device includes a memory having non-transitory instructions stored therein and a processor coupled to the memory, and being configured to execute the instructions, thereby causing the device to transmit an IPV6 address request to a router, receive a router advertisement message in response to the IPV6 address request, detect an invalid result indicator in the router advertisement message, in response to the invalid result indicator, transmit an IPv4 address request to the router, receive IPv4 address and DNS server information in response to the IPv4 address request, and in response to the IPV4 address and DNS server information, perform a router connection operation using IPv6. In some embodiments, the instructions are executable by the processor to cause the device to transmit the IPV6 address request as part of a PnP operation. In some embodiments, the instructions are executable by the processor to cause the device to transmit each of the IPV6 and IPv4 address requests configured in accordance with the router being a HGW router. In some embodiments, the instructions are executable by the processor to cause the device to detect the invalid result indicator by detecting a value of zero for each of an M-bit and an O-bit of a header of the router advertisement message. In some embodiments, the instructions are executable by the processor to further cause the device to, prior to performing the router connection operation, resolve network information using the IPv4 address and DNS server information. In some embodiments, the instructions are executable by the processor to cause the device to perform the router connection operation including performing a secure gateway connection operation. In some embodiments, the device is configured as a small cell base station.

In some embodiments, a gateway connection method executed by a processor of a device includes transmitting an IPV6 address request to a router, receiving a router advertisement message in response to the IPV6 address request, detecting an invalid result indicator in the router advertisement message, in response to the invalid result indicator, transmitting an IPV4 address request to the router, receiving IPv4 address and DNS server information in response to the IPV4 address request, and in response to the IPV4 address and DNS server information, performing a router connection operation using IPV6. In some embodiments, transmitting the IPV6 address request, receiving the router advertisement message, detecting the invalid result indicator, transmitting the IPv4 address request, receiving the IPv4 address and DNS server information, and performing the router connection operation are part of a PnP operation. In some embodiments, transmitting the IPV6 and IPv4 address requests includes transmitting the IPV6 and IPv4 address requests configured in accordance with the router being a HGW router. In some embodiments, detecting the invalid result indicator in the router advertisement message includes detecting a value of zero for each of an M-bit and an O-bit of a header of the router advertisement message. In some embodiments, the method includes, prior to performing the router connection operation, resolving network information using the IPv4 address and DNS server information. In some embodiments, performing the router connection operation includes performing a secure gateway connection operation. In some embodiments, transmitting the IPV6 address request, receiving the router advertisement message, detecting the invalid result indicator, transmitting the IPv4 address request, receiving the IPv4 address and DNS server information, and performing the router connection operation are executed by the processor of a small cell base station.

In some embodiments, a computer-readable medium includes instructions executable by a controller of a device to cause the controller to perform operations including transmitting an IPv6 address request to a router, receiving a router advertisement message in response to the IPV6 address request, detecting an invalid result indicator in the router advertisement message, in response to the invalid result indicator, transmitting an IPV4 address request to the router, receiving IPv4 address and DNS server information in response to the IPV4 address request, and in response to the IPV4 address and DNS server information, performing a router connection operation using IPv6. In some embodiments, the instructions are executable by the controller of the device to cause the controller to transmit the IPV6 address request, receive the router advertisement message, detect the invalid result indicator, transmit the IPV4 address request, receive the IPV4 address and DNS server information, and perform the router connection operation are as part of a PnP operation of a small cell base station. In some embodiments, the instructions are executable by the controller of the device to cause the controller to transmit the IPV6 and IPv4 address requests configured in accordance with the router being a HGW router. In some embodiments, the instructions are executable by the controller of the device to cause the controller to detect the invalid result indicator in the router advertisement message by detecting a value of zero for each of an M-bit and an O-bit of a header of the router advertisement message. In some embodiments, the instructions are executable by the controller of the device to cause the controller to resolve network information using the IPv4 address and DNS server information prior to performing the router connection operation. In some embodiments, the instructions are executable by the controller of the device to cause the controller to perform the router connection operation by performing a secure gateway connection operation.

The foregoing outlines features of several embodiments so that those skilled in the art better understand the aspects of the present disclosure. Those skilled in the art appreciate that they readily use the present disclosure as a basis for designing or modifying other processes and structures for carrying out the same purposes and/or achieving the same advantages of the embodiments introduced herein. Those skilled in the art also realize that such equivalent constructions do not depart from the spirit and scope of the present disclosure, and that they make various changes, substitutions, and alterations herein without departing from the spirit and scope of the present disclosure.

What is claimed is:

1. A device comprising:

a memory having non-transitory instructions stored therein; and a processor coupled to the memory, and being configured to execute the instructions, thereby causing the device to:

in response to a power on sequence of the device, transmit an internet protocol version 6 (IPv6) address request to a router;

receive a router advertisement message in response to the IPV6 address request;

detect an invalid result indicator in the router advertisement message;

in response to the invalid result indicator, transmit an internet protocol version 4 (IPv4) address request to the router;

receive IPv4 address and domain name system (DNS) server information in response to the IPv4 address request; and in response to the IPv4 address and DNS server information, perform at least one router connection operation configured to establish a connection of the device to a gateway using IPv6.

2. The device of claim 1, wherein the instructions are executable by the processor to cause the device to transmit the IPV6 address request as part of a plug-and-play (PnP) operation.

3. The device of claim 1, wherein the instructions are executable by the processor to cause the device to transmit each of the IPV6 and IPv4 address requests configured in accordance with the router being a home gateway (HGW) router.

4. The device of claim 1, wherein the instructions are executable by the processor to cause the device to detect the invalid result indicator by detecting a value of zero for each of an M-bit and an O-bit of a header of the router advertisement message.

5. The device of claim 1, wherein the instructions are executable by the processor to further cause the device to:

prior to performing the at least one router connection operation, resolve network information using the IPv4 address and DNS server information.

6. The device of claim 1, wherein the instructions are executable by the processor to cause the device to perform the at least one router connection operation comprising at least one of executing an internet key exchange operation or transmitting a power-on notification.

7. The device of claim 1, wherein the device is configured as a small cell base station.

8. A gateway connection method executed by a processor of a device, the method comprising:

in response to a power on sequence of the device, transmitting an internet protocol version 6 (IPv6) address request to a router;

receiving a router advertisement message in response to the IPV6 address request;

detecting an invalid result indicator in the router advertisement message;

in response to the invalid result indicator, transmitting an internet protocol version 4 (IPv4) address request to the router;

receiving IPv4 address and domain name system (DNS) server information in response to the IPv4 address request; and in response to the IPv4 address and DNS server information, performing at least one router connection operation configured to establish a connection of the device to a gateway using IPv6.

9. The method of claim 8, wherein the transmitting the IPV6 address request, the receiving the router advertisement message, the detecting the invalid result indicator, the transmitting the IPV4 address request, the receiving the IPV4 address and DNS server information, and the performing the at least one router connection operation are part of a plug-and-play (PnP) operation.

10. The method of claim 8, wherein the transmitting the IPV6 and IPV4 address requests comprises transmitting the IPV6 and IPv4 address requests configured in accordance with the router being a home gateway (HGW) router.

11. The method of claim 8, wherein the detecting the invalid result indicator in the router advertisement message comprises detecting a value of zero for each of an M-bit and an O-bit of a header of the router advertisement message.

12. The method of claim 8, further comprising:

prior to the performing the at least one router connection operation, resolving network information using the IPV4 address and DNS server information.

13. The method of claim 8, wherein the performing the at least one router connection operation comprises at least one of executing an internet key exchange operation or transmitting a power-on notification.

14. The method of claim 8, wherein the transmitting the IPV6 address request, the receiving the router advertisement message, the detecting the invalid result indicator, the transmitting the IPV4 address request, the receiving the IPV4 address and DNS server information, and the performing the at least one router connection operation are executed by the processor of a small cell base station.

15. A non-transitory computer-readable medium including instructions executable by a controller of a device to cause the controller to perform operations comprising:

in response to a power on sequence of the device, transmitting an internet protocol version 6 (IPv6) address request to a router;

receiving a router advertisement message in response to the IPV6 address request;

detecting an invalid result indicator in the router advertisement message;

in response to the invalid result indicator, transmitting an internet protocol version 4 (IPv4) address request to the router;

receiving IPv4 address and domain name system (DNS) server information in response to the IPv4 address request; and in response to the IPV4 address and DNS server information, performing at least one router connection operation configured to establish a connection of the device to a gateway using IPv6.

16. The non-transitory computer-readable medium of claim 15, wherein the instructions are executable by the controller of the device to cause the controller to transmit the IPV6 address request, receive the router advertisement message, detect the invalid result indicator, transmit the IPV4 address request, receive the IPV4 address and DNS server information, and perform the at least one router connection operation are as part of a plug-and-play (PnP) operation of a small cell base station.

17. The non-transitory computer-readable medium of claim 15, wherein the instructions are executable by the controller of the device to cause the controller to transmit the IPV6 and IPV4 address requests configured in accordance with the router being a home gateway (HGW) router.

18. The non-transitory computer-readable medium of claim 15, wherein the instructions are executable by the controller of the device to cause the controller to detect the invalid result indicator in the router advertisement message by detecting a value of zero for each of an M-bit and an O-bit of a header of the router advertisement message.

19. The non-transitory computer-readable medium of claim 15, wherein the instructions are executable by the controller of the device to cause the controller to resolve network information using the IPV4 address and DNS server information prior to performing the at least one router connection operation.

20. The non-transitory computer-readable medium of claim 15, wherein the instructions are executable by the controller of the device to cause the controller to perform the at least one router connection operation by at least one of executing an internet key exchange operation or transmitting a power-on notification.

* * * * *